US011679898B2

(12) United States Patent
Danko et al.

(10) Patent No.: US 11,679,898 B2
(45) Date of Patent: Jun. 20, 2023

(54) INSPECTION AND REPAIR TOOL

(71) Applicants: General Electric Company, Schenectady, NY (US); Oliver Crispin Robotics Limited, Altrincham (GB)

(72) Inventors: Todd William Danko, Niskayuna, NY (US); Ambarish Jayant Kulkarni, Glenville, NY (US); Margeaux Wallace, Niskayuna, NY (US); Hrishikesh Keshavan, Watervliet, NY (US); Bernard Patrick Bewlay, Niskayuna, NY (US); Byron Andrew Pritchard, Jr., Loveland, OH (US); Michael Dean Fullington, West Chester, OH (US); Andrew Crispin Graham, Badminton (GB); Trevor Owen Hawke, Bristol (GB); Julian Matthew Foxall, Bristol (GB); Ahmed M ELKady, West Chester, OH (US)

(73) Assignees: General Electric Company, Schenectady, NY (US); Oliver Crispin Robotics Limited, Altrincham (GB)

( * ) Notice: Subject to any disclaimer, the term of this patent is extended or adjusted under 35 U.S.C. 154(b) by 289 days.

(21) Appl. No.: 16/901,386

(22) Filed: Jun. 15, 2020

(65) Prior Publication Data

US 2021/0387746 A1 Dec. 16, 2021

(51) Int. Cl.
*B64F 5/40* (2017.01)
*B05B 15/68* (2018.01)
*B05B 15/70* (2018.01)
*B05B 12/12* (2006.01)
*G01N 21/88* (2006.01)
*G01N 21/954* (2006.01)

(52) U.S. Cl.
CPC .............. *B64F 5/40* (2017.01); *B05B 12/124* (2013.01); *B05B 15/68* (2018.02); *B05B 15/70* (2018.02); *G01N 21/8851* (2013.01); *G01N 21/954* (2013.01)

(58) Field of Classification Search
USPC ................. 118/321, 323, 306, 317, 712, 713
See application file for complete search history.

(56) References Cited

U.S. PATENT DOCUMENTS

| 5,644,394 | A | 7/1997 | Owens |
| 7,032,279 | B2 | 4/2006 | McCarvill et al. |

(Continued)

FOREIGN PATENT DOCUMENTS

| WO | WO-2016076704 A1 * | 5/2016 | ............ B64F 5/0045 |
| WO | 2018/222174 A1 | 12/2018 | |
| WO | 2019/210997 A1 | 11/2019 | |

*Primary Examiner* — Yewebdar T Tadesse
(74) *Attorney, Agent, or Firm* — Fitch, Even, Tabin & Flannery, LLP

(57) ABSTRACT

A method for inspecting and repairing a surface of a component of a gas turbine engine, the method including: inserting an inspection and repair tool into an interior of the gas turbine engine; inspecting the surface of the component with the inspection and repair tool; performing a repair of the surface of the component with the inspection and repair tool from within the interior of the gas turbine engine, the inspection and repair tool remaining within the interior of the gas turbine engine between inspecting the component and performing the repair of the surface of the component.

18 Claims, 8 Drawing Sheets

(56) References Cited

U.S. PATENT DOCUMENTS

| | | |
|---|---|---|
| 7,509,735 B2 | 3/2009 | Philip et al. |
| 7,531,048 B2 * | 5/2009 | Woodcock ............... B08B 9/00 134/22.18 |
| 9,403,244 B2 | 8/2016 | Rautenberg et al. |
| 10,265,726 B2 | 4/2019 | Dubanchet et al. |
| 2013/0135457 A1 * | 5/2013 | Kell .................. G01M 15/14 348/82 |
| 2017/0268342 A1 * | 9/2017 | Roberts ................. B23K 9/235 |
| 2017/0298875 A1 * | 10/2017 | Patel ...................... F23R 3/36 |
| 2017/0321317 A1 | 11/2017 | Renteria et al. |
| 2018/0154381 A1 | 6/2018 | Bewlay et al. |
| 2018/0156062 A1 | 6/2018 | Dede et al. |
| 2018/0156132 A1 * | 6/2018 | Dede ................... F01D 21/003 |
| 2018/0223667 A1 | 8/2018 | Danko et al. |
| 2018/0257235 A1 | 9/2018 | Alatorre Troncoso et al. |
| 2018/0371914 A1 | 12/2018 | Karigiannis et al. |
| 2019/0054638 A1 * | 2/2019 | Norton ..................... B25J 9/06 |
| 2019/0095765 A1 | 3/2019 | Lim et al. |
| 2019/0143350 A1 | 5/2019 | Kulkarni et al. |
| 2019/0143358 A1 | 5/2019 | Kulkarni et al. |

\* cited by examiner

INSPECTION AND REPAIR TOOL

FIELD

The present subject matter relates generally to an inspection and repair tool for use within a gas turbine engine, and a method for using the same.

BACKGROUND

The use of thermal barrier coatings (TBCs) on components such as combustors, high pressure turbine (HPT) blades, vanes and shrouds helps such components to survive higher operating temperatures, increases component durability, and improves engine reliability. TBCs are typically formed of a ceramic material and deposited on an environmentally-protective bond coat to form what is termed a TBC system.

Under service conditions, hot section engine components protected by a TBC system can be susceptible to various modes of damage, including erosion, oxidation and corrosion from exposure to the gaseous products of combustion, foreign object damage (FOD), and attack from environmental contaminants. The source of environmental contaminants is ambient air, which is drawn in by the engine for cooling and combustion. The type of environmental contaminants in ambient air will vary from location to location, but can be of a concern to aircraft as their purpose is to move from location to location. These environmental contaminants are in addition to the corrosive and oxidative contaminants that result from the combustion of fuel.

Some of these contaminants may result in TBC loss over the life of the components, leaving a thin portion of the TBCs, or completely removing a portion of the TBCs leaving the underlying component exposed to the operational conditions and potentially damaging such component. Accordingly, a method and system for repairing a TBC would be useful.

BRIEF DESCRIPTION

Aspects and advantages of the invention will be set forth in part in the following description, or may be obvious from the description, or may be learned through practice of the invention.

An aspect of the present disclosure is directed to a method for inspecting and repairing a surface of a component of a gas turbine engine. The method includes: inserting an inspection and repair tool into an interior of the gas turbine engine; inspecting the surface of the component with the inspection and repair tool; performing a repair of the surface of the component with the inspection and repair tool from within the interior of the gas turbine engine, the inspection and repair tool remaining within the interior of the gas turbine engine between inspecting the component and performing the repair of the surface of the component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
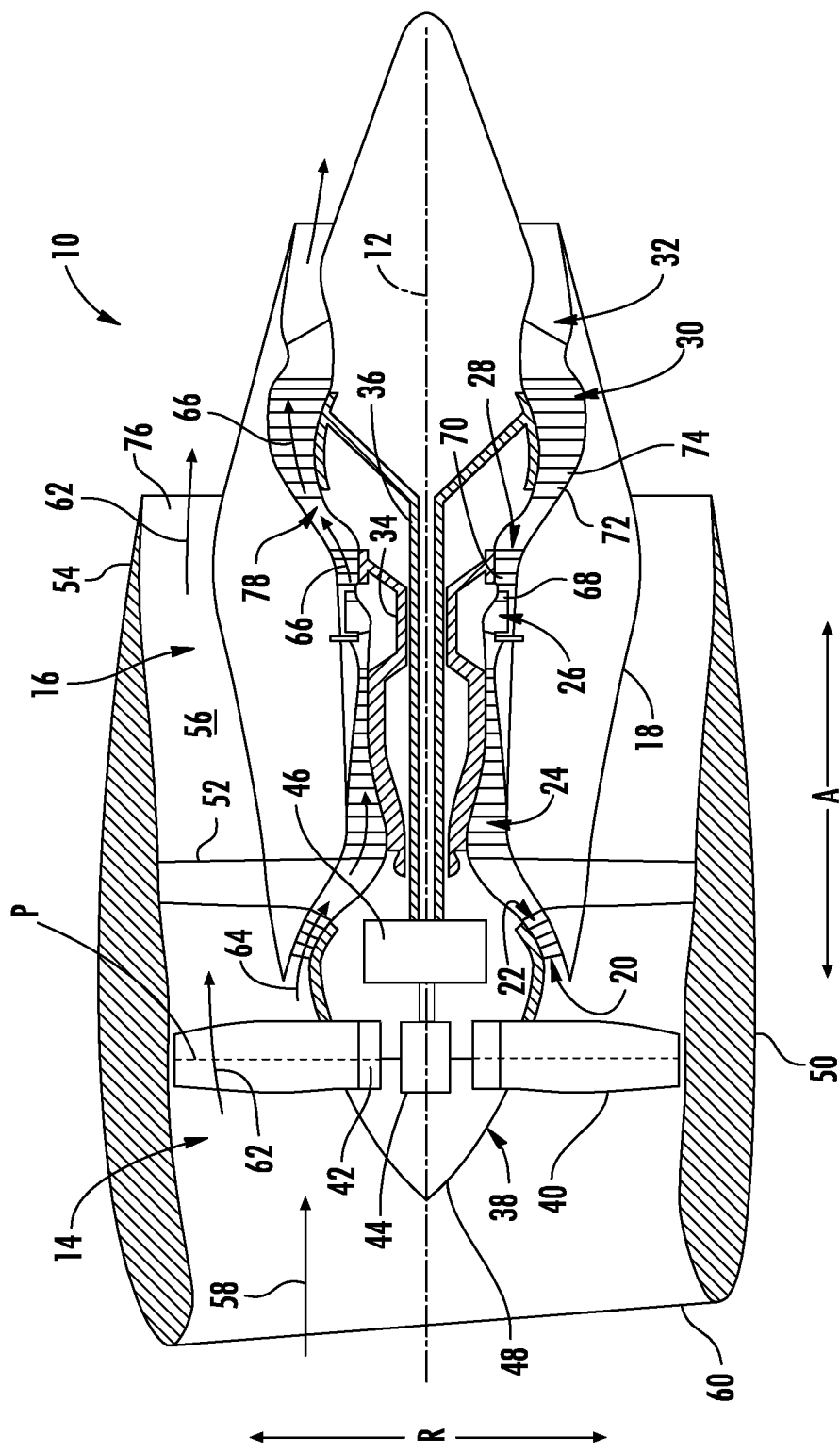
FIG. 1 is a schematic cross-sectional view of an exemplary gas turbine engine according to various embodiments of the present subject matter.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The term "repair," as it relates to a component, refers generally any repair or maintenance activity on such component, including any activity that adds material to the component, removes material from the component, or changes a materials property of all or part of the component. In at least certain embodiments, the term "repair," as it relates to a component, refers to performing tasks related to rejuvenating a damaged portion of the component and maintaining or protecting damaged and undamaged portions of the component.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

It will be appreciated, that in order to repair damaged areas of a thermal barrier coating ("TBC"), it is generally necessary to manually perform one or more inspection operations using, e.g., a borescope inspection tool. Any areas in need of repair may be recorded during the inspection operations. Subsequently, the engine may be taken "off wing" (i.e., uninstalled from the aircraft), the component may be removed (or the engine may be disassembled to an extent that the component is exposed), the area needing repair may be cleaned, a thermal barrier coating patch may be applied and cured, and the component may be reinstalled and the engine re-mounted to the aircraft.

Such is a fairly time consuming and costly process. In view of the above, it can be appreciated that it would be desirable if systems and methods were available for repairing and inspecting a thermal barrier coating without requiring multiple different tools and without requiring the engine to be taken off wing and at least partially disassembled.

Accordingly, aspects of the present disclosure provide for a system and method for repairing a surface of a component of a gas turbine engine, such as a TBC of a component of a gas turbine engine. The system and method described herein may facilitate the inspection and repair of the TBC or other aspect of the component in situ.

In at least one exemplary aspect, the method may include inserting an inspection and repair tool into an interior of the gas turbine engine; inspecting the surface of the component with the inspection and repair tool; and performing a repair of the surface of the component with the inspection and repair tool from within the interior of the gas turbine engine. In such a manner, it will be appreciated that the inspection and repair tool remains within the interior of the gas turbine engine between inspecting the component and performing the repair of the surface of the component. Such may effectively result in a more compact inspection and repair process utilizing the inspection and repair tool, saving time and cost compared to the traditional inspection and repair processes. More specifically, by using a tool capable of performing both inspection and repair processes, the overall time to perform these operations, and the amount of time an engine is out of service, may be reduced.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across an optional power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP)

compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

Figure 2:
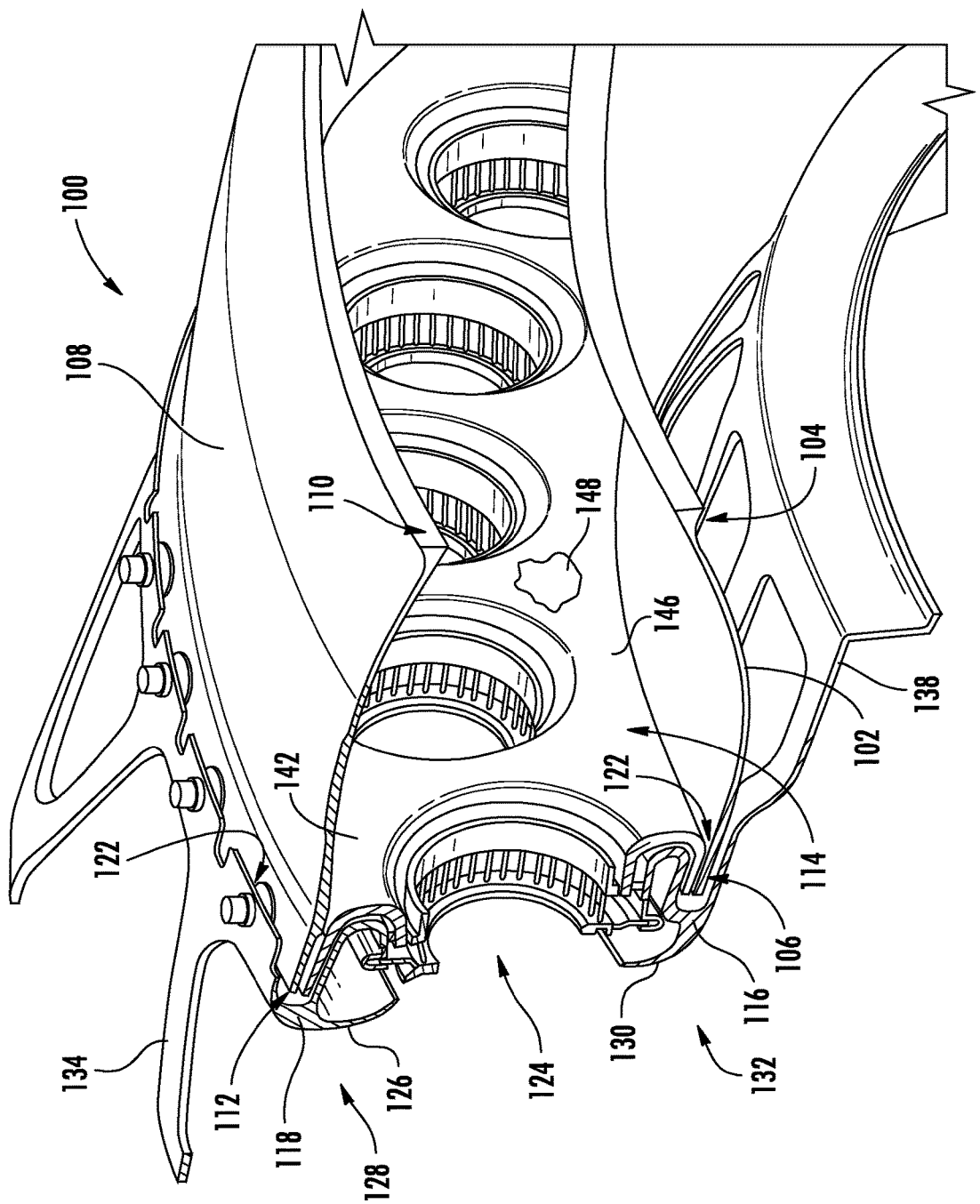
FIG. 2 is a perspective, cross-sectional view of a combustor assembly in accordance with an exemplary embodiment of the present disclosure having a damaged TBC.

Referring now to FIG. 2, a close-up cross-sectional view is provided of the combustion section 26 of the exemplary turbofan engine 10 of FIG. 1. More particularly, FIG. 2 provides a perspective, cross-sectional view of a combustor assembly 100, which may be positioned in the combustion section 26 of the exemplary turbofan engine 10 of FIG. 1, in accordance with an exemplary embodiment of the present disclosure.

As shown, the combustor assembly 100 generally includes an inner liner 102 extending between an aft end 104 and a forward end 106 generally along the axial direction A, as well as an outer liner 108 also extending between and aft end 110 and a forward end 112 generally along the axial direction A. The inner and outer liners 102, 108 together at least partially define a combustion chamber 114 therebetween. The inner and outer liners 102, 108 are each attached to an annular dome. More particularly, the combustor assembly 100 includes an inner annular dome 116 attached to the forward end 106 of the inner liner 102 and an outer annular dome 118 attached to the forward end 112 of the outer liner 108. Although the inner and outer annular domes 116, 118 are shown each including an enclosed surface defining a slot 122 for receipt of the forward ends 106, 112 of the respective inner and outer liners 102, 108, any suitable attachment scheme can be utilized to attach the liners to the respective domes. Also, although the exemplary combustor assembly 100 is shown including an inner and an outer annular dome, it is to be understood that in other embodiments, the dome may be formed as a single dome construction or any other suitable multi-dome construction (e.g., 3 domes, etc.).

The combustor assembly 100 further includes a plurality of fuel air mixers 124 spaced along a circumferential direction within the outer dome 118. More particularly, the plurality of fuel air mixers 124 are disposed between the outer dome 118 and the inner dome 116 along the radial direction R. Compressed air from the compressor section of the turbofan engine 10 flows into or through the fuel air mixers 124, where the compressed air is mixed with fuel and ignited to create the combustion gases 66 within the combustion chamber 114. The inner and outer domes 116, 118 are configured to assist in providing such a flow of compressed air from the compressor section into or through the fuel air mixers 126. For example, the outer dome 118 includes an outer cowl 126 at a forward end 128 and the inner dome 116 similarly includes an inner cowl 130 at a forward end 132. The outer cowl 126 and inner cowl 130 may assist in directing the flow of compressed air from the compressor section 26 into or through one or more of the fuel air mixers.

Moreover, the inner and outer domes 116, 118 each include attachment portions configured to assist in mounting the combustor assembly 100 within the turbofan engine 10. For example, the outer dome 118 includes an attachment extension 134 configured to be mounted to an outer combustor casing (not shown) and the inner dome 116 includes a similar attachment extension 138 configured to attach to an annular support member (not shown) within the turbofan engine 10. In certain exemplary embodiments, the inner dome 116 may be formed integrally as a single annular component, and similarly, the outer dome 118 may also be formed integrally as a single annular component. It should be appreciated, however, that in other exemplary embodiments, the inner dome 116 and/or the outer dome 118 may alternatively be formed by one or more components joined in any suitable manner. For example, with reference to the outer dome 118, in certain exemplary embodiments, the outer cowl 126 may be formed separately from the outer dome 118 and attached to the forward end 128 of the outer dome 118 using, e.g., a welding process. Similarly, the attachment extension 134 may also be formed separately from the outer dome 118 and attached to the forward end 128 of the outer dome 118 using, e.g., a welding process. Additionally, or alternatively, the inner dome 116 may have a similar configuration.

Referring still to FIG. 2, the exemplary combustor assembly 100 further includes a plurality of heat shields 142 positioned around each fuel air mixer 124, arranged circumferentially. The heat shields 142, for the embodiment depicted, are attached to and extend between the outer dome 118 and the inner dome 116. The heat shields 142 are configured to protect certain components of the turbofan engine 10 from the relative extreme temperatures of the combustion chamber 114.

As will be appreciated, each of the heat shield 142, inner liner 102, and outer liner 104 are exposed to the relatively harsh conditions of relatively high temperatures during operation of the gas turbine engine. As such, a thermal barrier coating 146 is provided at least on the exposed surfaces of one or more of these components.

Particularly for the embodiment of FIG. 2, the heat shields 142 include a thermal barrier coating 146 for protecting the underlying structure of the heat shields 142. The thermal barrier coating 146 may be a ceramic coating, or any other suitable coating.

Further, as will also be appreciated, through operation of the gas turbine engine 10 one or more portions of the thermal barrier coating 146 may wear down or degrade more quickly than other portions of the thermal barrier coating 146. For example, as is depicted schematically in FIG. 2, the thermal barrier coating 146 includes a worn portion 148 between adjacent fuel air mixers 124. The worn portion 148 depicted schematically and FIG. 2 may represent a spallation of the thermal barrier coating.

Figure 3:
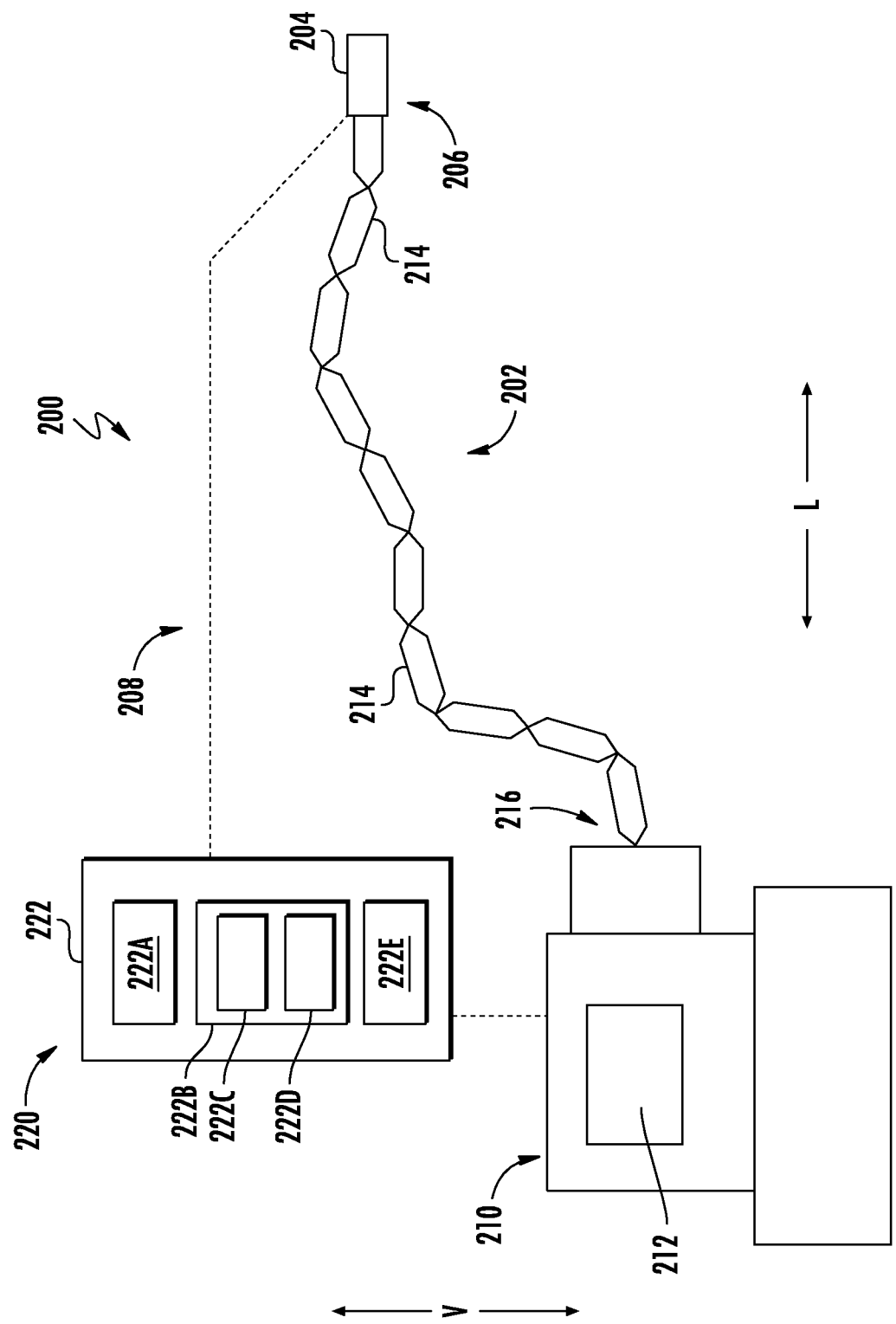
FIG. 3 is a schematic view of a system for inspecting and repairing a portion of thermal barrier coating of a component in situ in accordance with an exemplary embodiment of the present disclosure.

Referring now to FIG. 3, an inspection and repair tool 200 in accordance with an exemplary embodiment of the present disclosure is provided as may be used with the exemplary gas turbine engine 10 and components thereof described above with reference to FIGS. 1 and 2.

For the exemplary embodiment of FIG. 3, the inspection and repair tool 200 generally includes an elongated insertion member 202 and an implement body 204 attached to the elongated insertion member 202 at a distal end 206 of the elongated insertion member 202. As will be described in more detail, below, the implement body 204 may be configured to perform one or more inspection and/or repair operations.

More specifically, for the embodiment of FIG. 3, the inspection and repair tool 200 utilizes a robotic arm assembly 208, sometimes also referred to as a "snake-arm" assembly, and the elongated insertion member 202 is configured as a robotic arm of the robotic arm assembly 208. The robotic arm assembly 208 generally defines a vertical direction V, a longitudinal direction L, and a lateral direction (perpendicular to the longitudinal direction L and vertical direction V; not shown). In addition to the elongated insertion member 202, or rather the robotic arm, the robotic arm assembly 208 further includes a base 210. Although not depicted, the robotic arm defines a fluid passage therethrough. The fluid passage may be directly in fluid communication with a supply line and/or a fluid heater, or alternatively may be in fluid communication with a fluid source through the base 210.

For the embodiment shown, the base 210 generally includes one or more motors 212 operable with the robotic arm to actuate the robotic arm. Accordingly, the robotic arm assembly 208 depicted may be referred to as a motorized robotic arm assembly. Additionally, the robotic arm, for the embodiment depicted, includes a plurality of segments 214 (also referred to as "links") sequentially arranged and extending from the base 210 between a root end 216 and the distal end 206, e.g., generally along the longitudinal direction L of the robotic arm assembly 208 for the embodiment shown. Notably, the robotic arm is, for the embodiment depicted, coupled to the base 210 at its root end 216.

Further, referring particularly to the robotic arm, each segment 214 may be movable relative to a forward-adjacent segment 214 (i.e., a segment 214 immediately forward of the segment 214/towards the distal end 206) and aft-adjacent segment 214 (i.e., a segment 214 immediately aft of the segment 214/towards the root end 216) along at least two degrees of operation, as is depicted, to form the two-dimensional shape of the robotic arm in FIG. 3. For example, each segment 214 may be movable up or down relative to the forward-adjacent and aft-adjacent segments 214 along the vertical direction V of the robotic arm assembly 208. It will further be appreciated, however, that for the exemplary embodiment depicted each segment 214 is further movable relative to a respective forward-adjacent and aft-adjacent segment 214 along at least four degrees of operation. For example, each segment 214 may also be movable along a lateral direction (perpendicular to the longitudinal direction L and vertical direction V) relative to the forward-adjacent and aft-adjacent segments 214. In such a manner, the robotic arm may generally be movable to form various three-dimensional shapes. In such a manner, the robotic arm may be movable to position the distal end 206 and implement body 204 proximate to a number of different components within an interior of the gas turbine engine.

Briefly, as noted, the robotic arm assembly 208 depicted utilizes a motorized robotic arm assembly. Accordingly, it will be appreciated that in at least certain exemplary embodiments, the one or more motors 212 of the base 210 may generally pull on various wires (not shown) extending through the robotic arm and terminating at individual segments 214 of the robotic arm. By pulling on these various wires, the one or more motors 212 of the base 210 may control a movement of the segments 214 of the robotic arm.

However, in other embodiments, any other suitable configuration may be provided for controlling the robotic arm. In certain exemplary embodiments, the motors 212 may be operably coupled to a controller of the inspection and repair tool 200 (such as controller 220 of inspection and repair tool 200, discussed below).

It will further be appreciated, however, that in other exemplary embodiments, still other elongated insertion members 202 may be provided. For example, in other embodiments the elongated insertion member 202 may be a manual snake arm assembly, manually moved into position. Alternatively, the elongated insertion member 202 may be a flexible, or semi-flexible tube that may be bent into a desired shape to position its distal end 206 at a desired location within the interior of the gas turbine engine. Alternatively, still, the elongated insertion member 202 may be a series of links having predetermined shapes that are selectively rigidizable, such that they form a desired shape when moved to a rigid position to locate the implement body 204 at a desired location within the interior of the gas turbine engine. Other configurations are contemplated as well.

Referring still to the exemplary inspection and repair tool 200 depicted in FIG. 3, the exemplary inspection and repair tool 200 further includes a controller 220. The exemplary controller 220 depicted in FIG. 3 is configured to receive the data from aspects of the exemplary inspection and repair tool 200 (such as from the implement body 204, as described below) and, e.g., make control decisions for the inspection and repair tool 200 based on the received data.

Referring particularly to the operation of the controller 220, in at least certain embodiments, the controller 220 can include one or more computing device(s) 222. The computing device(s) 222 can include one or more processor(s) 222A and one or more memory device(s) 222B. The one or more processor(s) 222A can include any suitable processing device, such as a microprocessor, microcontroller, integrated circuit, logic device, and/or other suitable processing device. The one or more memory device(s) 222B can include one or more computer-readable media, including, but not limited to, non-transitory computer-readable media, RAM, ROM, hard drives, flash drives, and/or other memory devices.

The one or more memory device(s) 222B can store information accessible by the one or more processor(s) 222A, including computer-readable instructions 222C that can be executed by the one or more processor(s) 222A. The instructions 222C can be any set of instructions that when executed by the one or more processor(s) 222A, cause the one or more processor(s) 222A to perform operations. In some embodiments, the instructions 222C can be executed by the one or more processor(s) 222A to cause the one or more processor(s) 222A to perform operations, such as any of the operations and functions for which the controller 220 and/or the computing device(s) 222 are configured, the operations for operating the inspection and repair tool 200 (e.g., method 300), as described herein, and/or any other operations or functions of the one or more computing device(s) 222. The instructions 222C can be software written in any suitable programming language or can be implemented in hardware. Additionally, and/or alternatively, the instructions 222C can be executed in logically and/or virtually separate threads on processor(s) 222A. The memory device(s) 222B can further store data 222D that can be accessed by the processor(s) 222A.

The computing device(s) 222 can also include a network interface 222E used to communicate, for example, with the other components of the inspection and repair tool 200, the gas turbine engine being repaired, the aircraft incorporating the gas turbine engine, etc. For example, in the embodiment depicted, as noted above, the gas turbine engine and/or inspection and repair tool 200 includes one or more sensors for sensing data indicative of one or more parameters of the inspection and repair tool 200, the gas turbine engine, or both. The controller 220 is operably coupled to the one or more sensors through, e.g., the network interface 222E, such that the controller 220 may receive data indicative of various operating parameters sensed by the one or more sensors during operation. The network interface 222E can include any suitable components for interfacing with the one or more wired/wireless communications network(s), including for example, transmitters, receivers, ports, controllers, antennas, and/or other suitable components.

Figure 4:
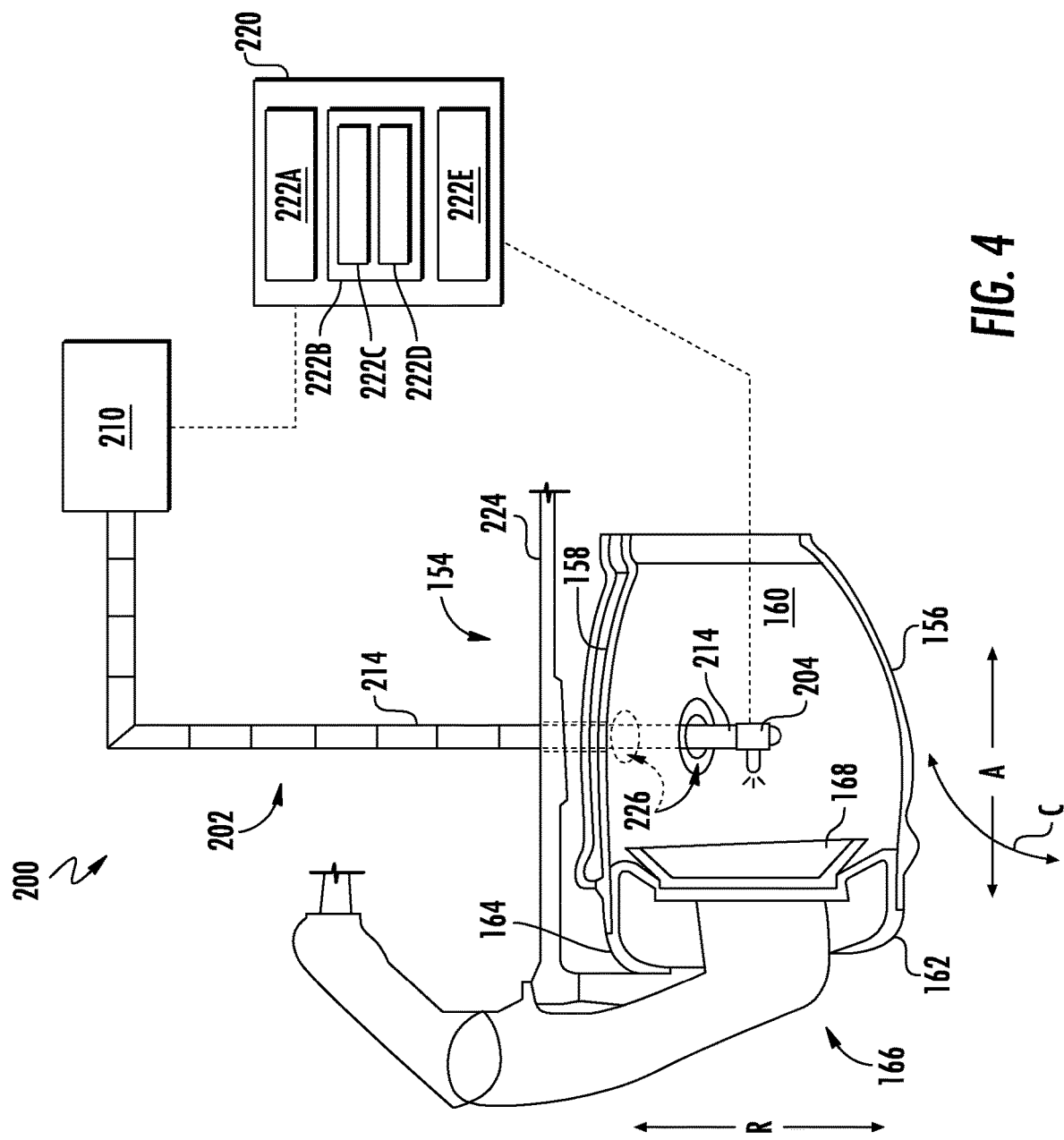
FIG. 4 is another schematic view of a system for inspecting and repairing a portion of thermal barrier coating of a component in situ in accordance with an exemplary embodiment of the present disclosure.

Referring now to FIG. 4, a close-up, side, cross-sectional view is provided of a combustor assembly 154 in accordance with an exemplary embodiment of the present disclosure, along with a schematic view of an inspection and repair tool 200 in accordance with the present disclosure. In certain exemplary embodiments, the inspection and repair tool 200 of FIG. 4 may be configured in a similar manner as the inspection and repair tool 200 of FIG. 3 and the combustor assembly 154 of FIG. 4 may be positioned in the combustion section 114 of the exemplary turbofan engine 100 of FIG. 2. Accordingly, it will be appreciated that the exemplary combustor assembly 154 generally defines an axial direction A, a radial direction R, and a circumferential direction C.

Referring first to the exemplary combustor assembly 154 depicted, the combustor assembly 154 generally includes an inner liner 156 extending generally along the axial direction A, as well as an outer liner 158 also extending generally along the axial direction A. The inner and outer liners 156, 158 together at least partially define a combustion chamber 160 therebetween. The inner and outer liners 156, 158 are each attached to an annular dome. More particularly, the annular dome includes an inner dome section 162 attached to the inner liner 156 and an outer dome section 164 attached to the outer liner 158. The inner and outer dome section 162, 164 may be formed integrally (or alternatively may be formed of a plurality of components attached in any suitable manner) and may each extend along the circumferential direction C to define an annular shape. The combustor assembly 154 further includes a fuel nozzle 166 positioned at least partially within the annular dome and a heat shield 168 positioned around the fuel nozzle 166. One or more of the inner and outer dome section 162, 164 and heat shield 168 may include a thermal barrier coating thereon.

During operation of the gas turbine engine including the exemplary combustor assembly 154 depicted, temperatures within the combustion chamber 160 may be relatively high, and over time the thermal barrier coating on one or more of the inner and outer dome section 162, 164 and heat shield 168 may degrade. Accordingly, the present disclosure generally provides for the inspection and repair tool 200 to inspect one or more of these components for such degradation and to repair the degradation in situ (i.e., while the combustor assembly 154 is installed in the gas turbine engine), and further without having to appreciably disassemble the gas turbine engine (e.g., remove components to expose the degraded thermal barrier coating components of the gas turbine engine).

With reference now particularly to the exemplary inspection and repair tool 200, it will be appreciated that combustor assembly 154 is enclosed by a casing 224. The casing 224 and, for the embodiment shown, the outer liner 158 of the combustor assembly 154, together define an access port 226. The access port 226 may be, e.g., an igniter port of the combustor assembly 154 or any other suitable access port 226 (e.g., a borescope hole, etc.), currently existing or added in the future. The inspection and repair tool 200, as noted above, generally includes an elongated insertion member 202 and an implement body 204 attached to the elongated insertion member 202. As with the exemplary embodiment of FIG. 3, the elongated insertion member 202 of the inspection and repair tool 200 of FIG. 4 is configured as a robotic arm. The robotic arm is configured to guide the implement body 204 through the access port 226 and into an interior of the gas turbine engine, and more specifically, within the interior of the combustor assembly 154, or rather, within the combustion chamber 160 of the exemplary combustor assembly 154 depicted.

In such a manner, it will be appreciated that the inspection and repair tool 200 may be utilized to perform one or more inspection and repair operations within the interior of the gas turbine engine, and more specifically, within the interior of the combustor assembly, by guiding implement body 204 into the interior. The implement body 204 may include one or more implements to facilitate inspections within the interior. For example, as will be described in more detail below, the implement body 204 may include a vision system for both providing feedback to assist with guiding the implement body 204 within the interior and inspecting one or more components within the interior. For example, the vision system may be utilized to inspect a thermal barrier coating on the inner dome 162, outer dome 164, heat shield 168, etc. Further, the implement body 204 may include one more implements to facilitate repairs within the interior. For example, the implement body 204 may include a spray head for spraying a thermal barrier coating patch onto a degraded portion of the thermal barrier coating within the interior (such as onto the worn portion 148 of the thermal barrier coating 146 discussed above with respect to FIG. 2).

Figure 5:
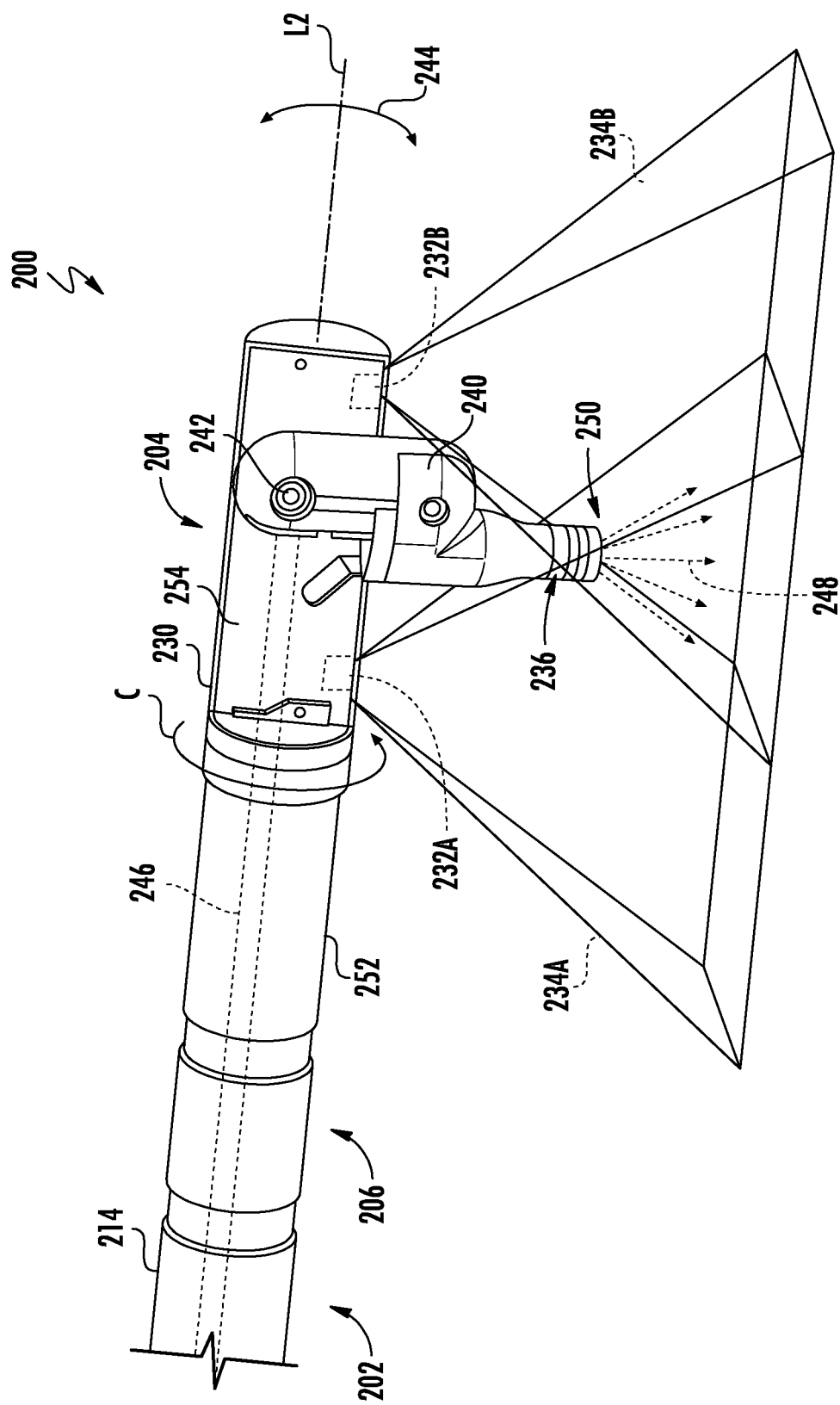
FIG. 5 is a close-up, perspective view of a distal end of an inspection and repair tool in accordance with an exemplary embodiment of the present disclosure having a spray head in a first position.

Referring now to FIG. 5, a close up, perspective view is provided of a distal end 206 of an inspection and repair tool 200 in accordance with an exemplary embodiment of the present disclosure. The exemplary inspection and repair tool 200 may be configured in substantially the same manner as the exemplary inspection and repair tools 200 described above with respect to FIGS. 3 and 4. For example, the inspection and repair tool 200 generally includes an elongated insertion member 202 and an implement body 204 attached to the elongated insertion member 202 at a distal end 206 of the elongated insertion member 202.

For the embodiment shown, the implement body 204 includes implements for performing inspection and repair operations. Specifically, for the embodiment shown, the implement body 204 includes a base 230 extending along a longitudinal direction L2 and a vision system. More specifically, for the embodiment shown, the vision system is positioned at least partially within or coupled to the base 230. More specifically, still, for the embodiment shown the vision system comprises a plurality of cameras 232, and in particular comprises a first camera 232A and a second camera 232B. The first and second cameras 232A, 232B are spaced along the longitudinal direction L2 of the base 230.

As is depicted in FIG. 5, the first camera 232A defines a first field of view 234A and the second camera 232B defines a second field of view 234B. The first field of view 234A overlaps with the second field of view 234B. More specifically, for the embodiment shown, the first field of view 234A overlaps with the second field of view 234B at a location 236 within about 12 inches from the base 230 of the implement body 204, such as at a location within about 8 inches, such as at a location within about 6 inches, such as at a location within about 3 inches, such as at a location within about 1 inch from the base 230 of the implement body 204.

In such a manner, the vision system may provide improved feedback for navigating the inspection and repair tool 200 within the interior of the gas turbine engine and inspection of the interior of the gas turbine engine. For example, the overlapping fields of view 234A, 234B may provide for a desired depth perception when operating the inspection and repair tool 200.

In addition, it will be appreciated that in certain exemplary embodiments, the implement body 204 may additionally or alternatively include any other suitable means for determining a distance between the implement body 204 and the components being inspected. For example, the implement body 204 may include one or more laser depth sensors, or other suitable hardware (now shown).

Figure 6:
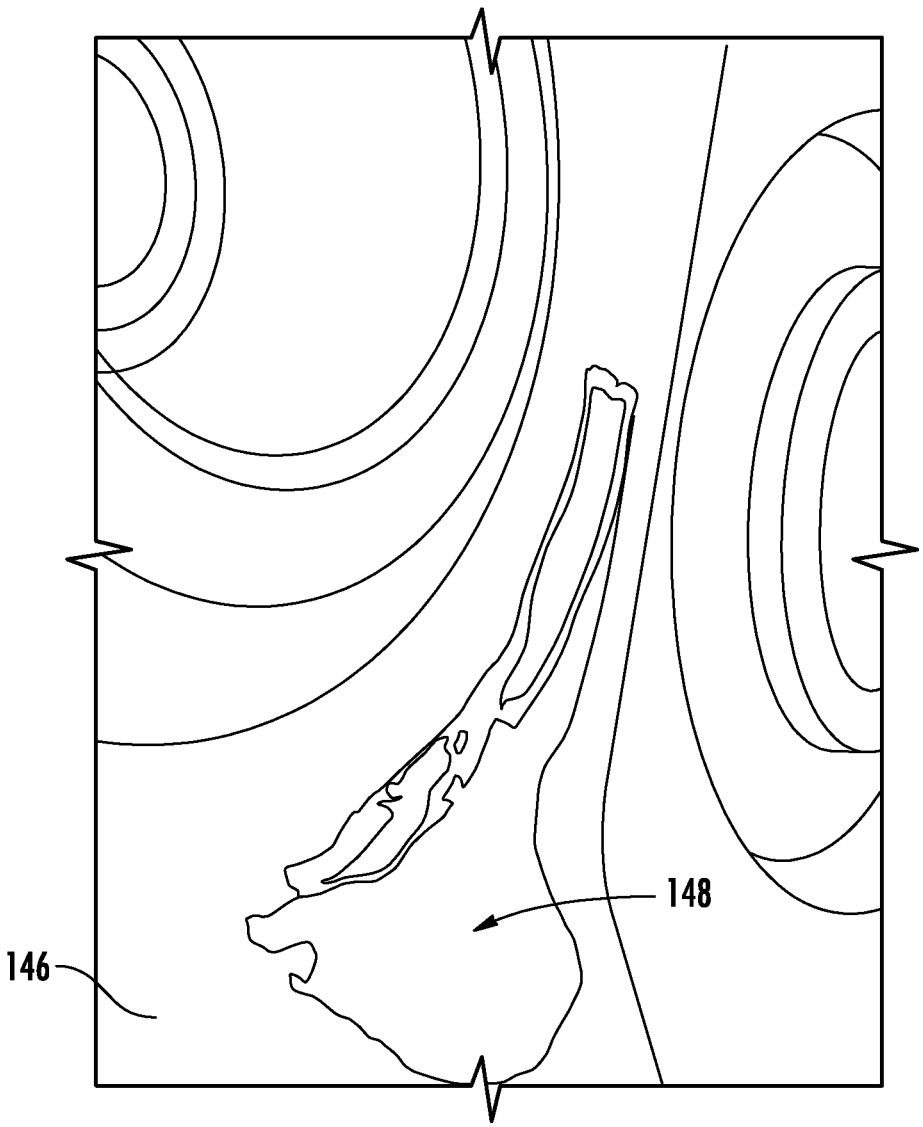
FIG. 6 is a picture of a thermal barrier coating in need of repair.

Moreover, it will be appreciated that the one or more cameras 232 of the vision system are operably coupled to the controller 220 (see FIGS. 3-4), such that the vision system and controller 220 may be used to inspect the interior of the gas turbine engine. For example, the vision system may be configured to communicate images of a thermal barrier coating within the interior to the controller 220, along with location information indicative of where the thermal barrier coating is within the interior. The controller 220 may be configured to then compare the images to one or more baseline images to determine whether or not there is damage to the thermal barrier coating. For example, referring briefly to FIG. 6, a sample image of a thermal barrier coating 146 is depicted on a dome (similar to the domes 162, 164 of FIG. 3) of a combustor assembly 154. The thermal barrier coating 146 includes a damaged portion 148, known as a spallation, where the thermal barrier coating 146 has worn down. The controller 220 may receive this image, compare it to one or more baseline images, and using, e.g., a pixel by pixel analysis, and determine there is damage in need of repair on the thermal barrier coating 146. The analysis by the controller 220 may determine the extent (e.g., depth, width, area, shape, etc.) of the damaged portion 148 to facilitate a tailored repair of such damaged portion 148, as discussed below.

It will be appreciated, however, that in other exemplary embodiments, the controller 220 may utilize any other suitable analysis technique to determine whether or not there is any damage to the thermal barrier coating 146, the extent of such damage, etc. For example, in other exemplary embodiments, the controller 220 may utilize a machine learning tool trained to identify the presence and/or extent of damage to a thermal barrier coating 146 or other component within an interior of an engine.

Figure 7:
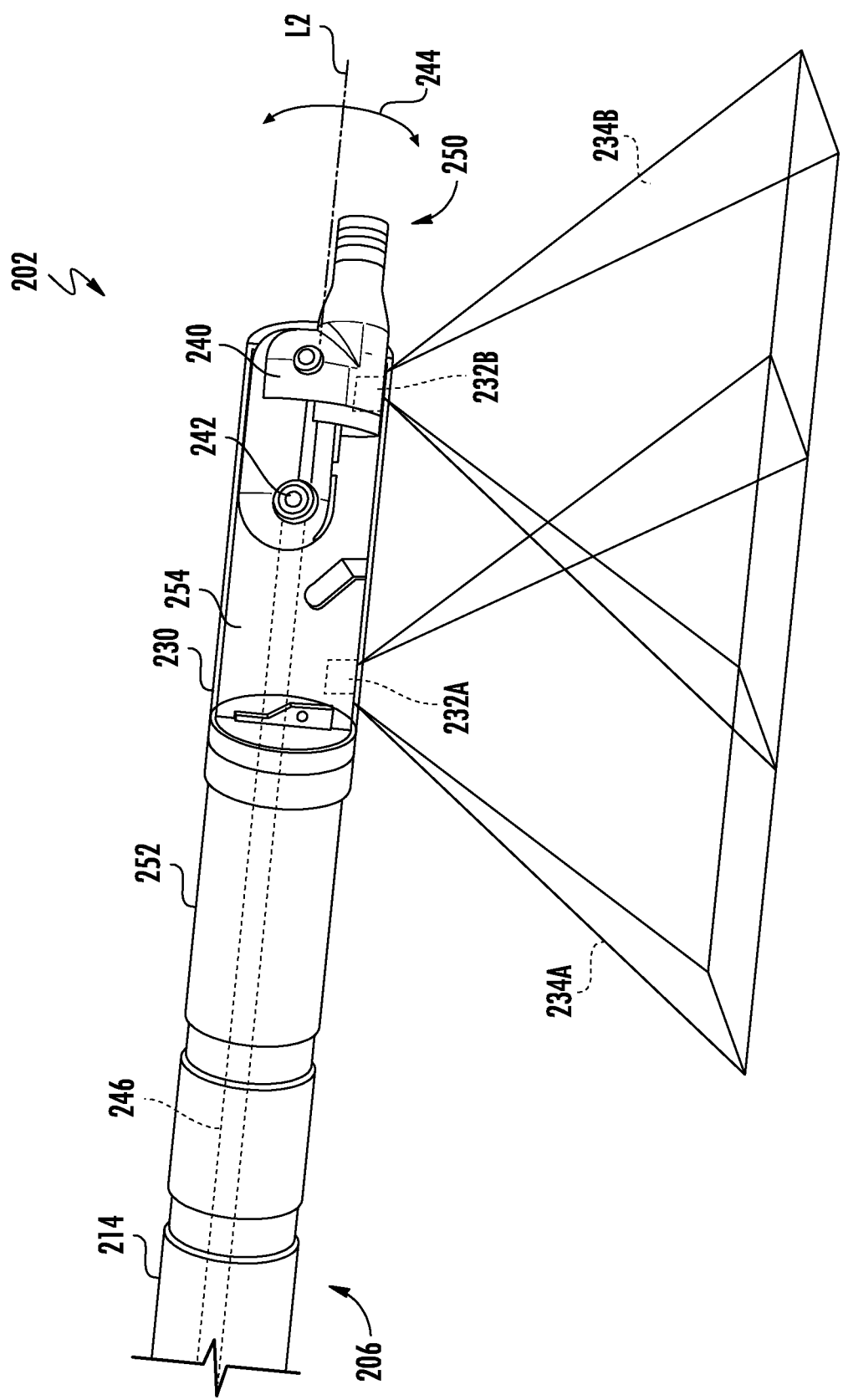
FIG. 7 is a close-up, perspective view of the distal end of the inspection and repair tool of FIG. 5 having the spray head in a second position.

Referring still to FIG. 5 and now also to FIG. 7, providing another schematic view of the exemplary inspection and repair tool 200 of FIG. 5, it will further be appreciated that the implement body 204 includes a spray head 240. The spray head 240 is moveably coupled to the base 230 of the implement body 204 and is moveable between a retracted position, as shown in FIG. 7, and an extended position, as shown in FIG. 5.

Specifically, for the embodiment shown, the spray head 240 is rotatably coupled to the base 230 about a pinned connection 242. For the embodiment shown, the spray head 240 rotates at least about 30 degrees, such as at least about 45 degrees, such as at least about 90 degrees and less than 360 degrees between the retracted position, as shown in FIG. 7, and the extended position, as shown in FIG. 5. Notably, for the embodiment shown, the spray head 240 rotates within a plane parallel to the longitudinal direction L2, along the reference arrow 244 in FIG. 5. In such a manner, the spray head 240 defines a first angle with the longitudinal direction L2 when in the extended position (e.g., about 90 degrees for the embodiment shown) and a second angle with the longitudinal direction L2 when in the retracted position that is different than the first angle (e.g., about 0 degrees for the embodiment shown).

In such a manner, the implement body 204 defines a smaller cross-sectional profile when the spray head 240 is in the retracted position to facilitate insertion of the implement body 204 into the interior of the gas turbine engine (e.g., through an access port, such as access port 226 of FIG. 4). Subsequently, once the implement body 204 is within the interior, the spray head 240 may be moved from the retracted position to the extended position to allow operation of the spray head 240 as explained below. The spray head 240 may be spring loaded.

Notably, for the embodiment shown, the spray head 240 is fluidly connected to a fluid source through one or more fluid passageways 246 extending along a length of the elongated insertion member 202. The one or more fluid passageways 246, depicted in phantom in FIGS. 5 and 7, may be a separate fluid conduit extended through the elongated insertion member 202, or may be formed integrally within the elongated insertion member 202. The one or more fluid passageways 246 may provide the spray head 240 with a flow of repair material 248 to be sprayed on the damaged portion of the thermal barrier coating to repair the damaged portion of the thermal barrier coating. The repair material 248 may be a slurry formed of a powder and carrier, which may be formed into a patch for the thermal barrier coating. For example, the powder may be a machine-curable ceramic powder mixture configured to bond to the damaged portion of the thermal barrier coating.

Although a single fluid passageway 246 is shown schematically in FIGS. 5 and 7, in other exemplary embodiments, the inspection and repair tool 200 may include a plurality of passageways. For example, the inspection and repair tool 200 may include a passageway for the repair material 248, a passageway for cleaning and conditioning fluid, a passageway for curing fluid, etc. Each of these passageways may be fixedly or selectively in fluid communication with the spray head 240.

Referring still to FIG. 5, it will further be appreciated that the spray head 240 defines an outlet 250 for spraying the repair material 248 onto the damaged portion of the thermal barrier coating. For the embodiment shown, the outlet 250 is within a field of view 234 of the vision system. More specifically, for the embodiment shown, the outlet 250 is within the first field of view 234A and/or the second field of view 234B of the first and second cameras 232 of the vision system. In such a manner, the controller 220 may be capable of confirming a positioning of the spray head 240 and a coverage of the repair material 248 (or other material/fluid) sprayed.

Further, still, it will be appreciated that the exemplary implement body 204 is capable of moving to assist with spraying operations. More specifically, for the embodiment shown, the implement body 204 includes a stationary portion 252 and a rotating portion 254. The rotating portion 254 includes the base 230 and the spray head 240, and is rotatably coupled to the stationary portion 252, such that it may rotate in a circumferential direction C about the longitudinal direction L2. The stationary portion 252 includes one or more motors positioned therein for selectively moving the rotating portion 254 about the circumferential direction C. Accordingly, it will be appreciated that in certain exemplary embodiments, the implement body 204 may move the spray head 240 along the circumferential direction C during spray operations to provide for a more even coverage of the repair material 248 (or other material/fluid) sprayed.

It will be appreciated that the exemplary inspection and repair tool 200 described hereinabove is provided by way of example only. In other exemplary embodiments, the inspection and repair tool 200 may have any other suitable configuration. For example, in other exemplary embodiments, the spray head 240 may be moveably coupled to the base 230 in any other suitable manner (such as rotating and sliding, etc.), the spray head 240 may have any other configuration of outlet(s) 250 (such as a linear array or other pattern of outlets 250), the implement body 204 may have any other suitable vision system or inspection system, the implement body 204 may be configured to rotate in any other suitable manner, etc.

Figure 8:
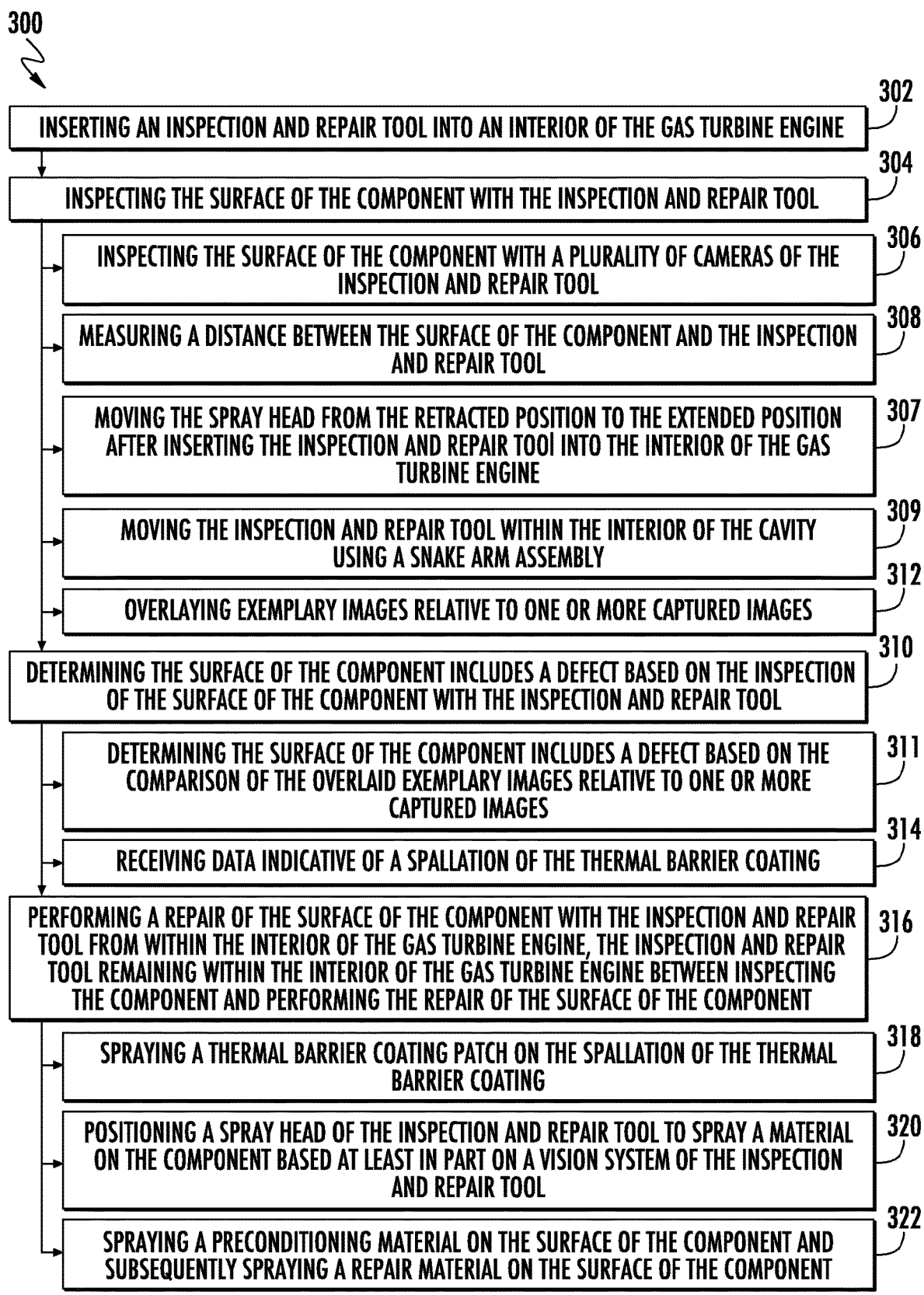
FIG. 8 is a flowchart of a method for inspecting and repairing a thermal barrier coating of a component of a gas turbine engine in accordance with an exemplary aspect of the present disclosure.

Referring now to FIG. 8, a method 300 for inspecting and repairing a surface of a component of a gas turbine engine is provided. The method 300 may utilize an inspection and repair tool in accordance with one or more of the exemplary configurations discussed above with respect to FIGS. 1 through 7.

The method 300 includes at (302) inserting an inspection and repair tool into an interior of the gas turbine engine. In certain exemplary aspects, inserting the inspection and repair tool into the interior of the gas turbine engine at (302) may include inserting the inspection and repair tool into the interior of the gas turbine engine through an inspection port of the engine to position an implement body of the inspection and repair tool within a combustion chamber of a combustor assembly of the engine.

The method 300 further includes at (304) inspecting the surface of the component with the inspection and repair tool. For the embodiment shown, inspecting the surface of the component with the inspection and repair tool at (304) includes at (306) inspecting the surface of the component with a plurality of cameras of the inspection and repair tool. In certain exemplary aspects, the plurality of cameras includes two cameras defining an overlapping field of view. Further for the embodiment shown, inspecting the surface of the component with the inspection and repair tool at (304) includes at (308) measuring a distance between the surface of the component and the inspection and repair tool.

Notably, for the exemplary aspect of FIG. 8, the inspection and repair tool includes a spray head that pivots between a retracted position and an extended position. With such an exemplary aspect, inspecting the surface of the component with the inspection and repair tool at (304) includes at (307) moving the spray head from the retracted position to the extended position after inserting the inspection and repair too into the interior of the gas turbine engine.

Additionally, in certain exemplary aspects, inspecting the surface of the component with the inspection and repair tool at (304) includes at (309) moving the inspection and repair tool within the interior of the cavity using a snake arm assembly.

The method 300 further includes at (310) determining the surface of the component includes a defect based on the inspection of the surface of the component with the inspection and repair tool. In such a manner, it will also be appreciated that inspecting the surface of the component with the inspection and repair tool at (304) may include utilizing any suitable inspection and analysis technique. For example, in certain exemplary aspects, inspecting the surface of the component with the inspection and repair tool at (304) includes at (312) overlaying exemplary images relative to one or more captured images, and determining the surface of the component includes a defect at (310) includes at (311) determining the surface of the component includes a defect based on the comparison of the overlaid exemplary images relative to one or more captured images.

Further, it will be appreciated that in certain exemplary aspects, the surface of the component is a thermal barrier coating of the component and determining the surface of the component includes a defect at (310) includes at (314) receiving data indicative of a spallation of the thermal barrier coating. The data indicative of a spallation of the thermal barrier coating may be the comparison data described above or may be the result of a machine learning tool trained to identify spallation.

The method 300 further includes at (316) performing a repair of the surface of the component with the inspection and repair tool from within the interior of the gas turbine engine, the inspection and repair tool remaining within the interior of the gas turbine engine between inspecting the component and performing the repair of the surface of the component. In such a manner, it will be appreciated that inspecting the surface of the component at (304) and performing the repair of the surface of the component at (316) may all be done in situ, without having to remove the inspection and repair tool. Such may allow for a more time efficient and cost efficient inspection and repair process.

Referring still to FIG. 8, it will be appreciated that in certain exemplary aspects, performing the repair of the surface of the component at (316) further includes at (318) spraying a thermal barrier coating patch on the spallation of the thermal barrier coating.

Additionally, in certain exemplary aspects, such as the exemplary aspect depicted, performing the repair of the surface of the component at (316) further includes at (320) positioning a spray head of the inspection and repair tool to spray a material on the component based at least in part on a vision system of the inspection and repair tool.

Further, in certain exemplary aspects, such as the exemplary aspect depicted, performing the repair of the surface of the component at (316) additionally includes at (322) spraying a preconditioning material on the surface of the component and subsequently spraying a repair material on the surface of the component. With such an exemplary aspect, the inspection and repair tool may remain within the interior of the gas turbine engine between spraying the preconditioning material on the surface of the component and spraying the repair material on the surface of the component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

A method for inspecting and repairing a surface of a component of a gas turbine engine comprising: inserting an inspection and repair tool into an interior of the gas turbine engine; inspecting the surface of the component with the inspection and repair tool; performing a repair of the surface of the component with the inspection and repair tool from within the interior of the gas turbine engine, the inspection and repair tool remaining within the interior of the gas turbine engine between inspecting the component and performing the repair of the surface of the component.

The method of one or more of these clauses, further comprising: determining the surface of the component includes a defect based on the inspection of the surface of the component with the inspection and repair tool.

The method of one or more of these clauses, wherein inspecting the surface of the component with the inspection and repair tool comprises inspecting the surface of the component with a plurality of cameras of the inspection and repair tool.

The method of one or more of these clauses, wherein the plurality of cameras includes two cameras defining an overlapping field of view.

The method of one or more of these clauses, wherein inspecting the surface of the component with the inspection and repair tool further comprises measuring a distance between the surface of the component and the inspection and repair tool.

The method of one or more of these clauses, wherein inspecting the surface of the component with the inspection and repair tool comprises overlaying exemplary images relative to one or more captured images.

The method of one or more of these clauses, wherein the surface of the component is a thermal barrier coating of the component.

The method of one or more of these clauses, further comprising: determining the surface of the component includes a defect based on the inspection of the surface of the component with the inspection and repair tool, and wherein determining the surface of the component includes the defect comprises receiving data indicative of a spallation of the thermal barrier coating.

The method of one or more of these clauses, wherein performing the repair of the surface of the component comprises spraying a thermal barrier coating patch on the spallation of the thermal barrier coating.

The method of one or more of these clauses, wherein performing the repair of the surface of the component comprises positioning a spray head of the inspection and repair tool to spray a material on the component based at least in part on a vision system of the inspection and repair tool.

The method of one or more of these clauses, wherein performing the repair of the surface of the component comprises spraying a preconditioning material on the surface of the component and subsequently spraying a repair material on the surface of the component, and wherein the inspection and repair tool remains within the interior of the gas turbine engine between spraying the preconditioning material on the surface of the component and spraying the repair material on the surface of the component.

The method of one or more of these clauses, wherein the inspection and repair tool includes a camera defining a field of view and a spray head, wherein the spray head includes an outlet, and wherein the outlet is within the field of view.

The method of one or more of these clauses, wherein the camera is a first camera, wherein the field of view is a first field of view, wherein the inspection and repair tool additionally includes a second camera defining a second field of view, wherein the first and second fields of view together define an overlapping field of view, wherein the outlet is within the overlapping field of view The method of one or more of these clauses, wherein the inspection and repair tool includes a spray head, and wherein the spray head pivots between a retracted position and an extended position.

The method of one or more of these clauses, wherein inspecting the surface of the component with the inspection and repair tool comprises moving the inspection and repair tool within the interior of the cavity using a snake arm robot.

A tool for inspecting, repairing, or both a component within a gas turbine engine comprising: an elongated insertion member; and an implement body attached to the elongated insertion member, the elongated insertion member configured to guide the implement body within the interior of the gas turbine engine, the implement body comprising a base and a spray head, the spray head moveably coupled to the base and moveable between a retracted position and an extended position.

The tool of one or more of these clauses, wherein the implement body defines a smaller cross-sectional profile when the spray head is in the retracted position to facilitate insertion of the implement body into an interior of the gas turbine engine.

The tool of one or more of these clauses, wherein the implement body further comprises a vision system positioned at least partially within or coupled to the base.

The tool of one or more of these clauses, wherein the vision system defines a field of view, wherein the spray head includes an outlet, and wherein the outlet is within the field of view.

The tool of one or more of these clauses, wherein the elongated insertion member is a robotic arm tool comprising one or more fluid passageways extending along a length thereof.

What is claimed is:

1. A tool for inspecting, repairing, or both a component within a gas turbine engine comprising:
    an elongated insertion member; and
    an implement body attached to the elongated insertion member, the elongated insertion member configured to guide the implement body within the interior of the gas turbine engine, the implement body comprising a base and a spray head, the spray head moveably coupled to the base and moveable between a retracted position and an extended position relative to the base;
    wherein the implement body comprises a stationary portion and a rotating portion, the rotating portion comprises the base and the spray head and is rotatably coupled to the stationary portion; and
    wherein the stationary portion comprises one or more motors positioned for selectively rotating the rotating portion.

2. The tool of claim 1, wherein the implement body defines a smaller cross-sectional profile when the spray head is in the retracted position to facilitate insertion of the implement body into an interior of the gas turbine engine.

3. The tool of claim 1, wherein the implement body further comprises a vision system positioned at least partially within or coupled to the base.

4. The tool of claim 3, wherein the vision system defines a field of view, wherein the spray head includes an outlet, and wherein the outlet is within the field of view.

5. The tool of claim 3, wherein the vision system comprises a plurality of cameras positioned spaced along a longitudinal direction.

6. The tool of claim 5, wherein the plurality of cameras comprises a first camera defining a first field of view and a second camera defining a second field of view, and wherein the first field of view overlaps with the second field of view defining an overlapping field of view.

7. The tool of claim 6, wherein an outlet of the spray head is within the overlapping field of view.

8. The tool of claim 1, wherein the elongated insertion member is a robotic arm tool.

9. The tool of claim 8, wherein the base comprises one or more motors configured to actuate the robotic arm tool.

10. The tool of claim 1, wherein the spray head is configured to spray a thermal barrier coating patch on a thermal barrier coating within the interior of the gas turbine engine.

11. The tool of claim 1, wherein the elongated insertion member comprises a plurality of segments sequentially arranged and extending from the base.

12. The tool of claim 1, wherein the spray head rotates at least 30 degrees between the retracted position and the extended position.

13. The tool of claim 1, wherein the spray head rotates at least 90 degrees between the retracted position and the extended position.

14. The tool of claim 1, wherein the spray head is spring loaded.

15. The tool of claim 1, wherein the elongated insertion member comprises a fluid passageway extending along a length thereof, and the spray head is fluidly connected to a fluid source through the fluid passageway.

16. The tool of claim 15, wherein the fluid passageway is configured to provide repair material, cleaning and conditioning fluid, or curing fluid.

17. The tool of claim 15, wherein the elongated insertion member comprises a plurality of fluid passageways selectively in fluid communication with the spray head, each of the plurality of fluid passageways providing a different type of fluid.

18. The tool of claim 1, wherein the implement body is configured to rotate the spray head during spray operation.

* * * * *